Aug. 15, 1961         G. H. LAVELY         2,996,409
COMPOSITE CELLULAR STRUCTURES AND PROCESS OF MAKING SAME
Filed Nov. 30, 1956
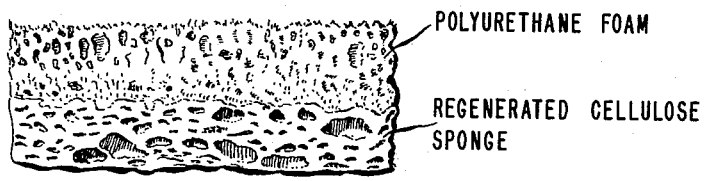
INVENTOR
GEORGE HAROLD LAVELY
BY
ATTORNEY United States Patent Office 2,996,409
Patented Aug. 15, 1961

2,996,409
COMPOSITE CELLULAR STRUCTURES AND PROCESS OF MAKING SAME
George Harold Lavely, Columbia, Tenn., assignor to E. I. du Pont de Nemours and Company, Wilmington, Del., a corporation of Delaware
Filed Nov. 30, 1956, Ser. No. 625,482
5 Claims. (Cl. 117—98)

This invention relates to composite cellular structures, and, more particularly, to composite porous structures of polyurethane foam bonded to regenerated cellulose and like hydrophilic (water absorptive) sponge structures, and to the process for producing such composite structures.

Polyurethane foams constitute excellent sponge-like materials having abrasive, wear-resistant, and heat-resistant surfaces which are very useful for cleaning purposes. These foams, however, are hydrophobic, and hence do not absorb water except by means of a slight wicking action. Thus, when they are being used for cleaning such things as pots, pans, etc., it becomes necessary to add extra water to keep the surfaces which are being cleaned wet. On the other hand, regenerated cellulose sponges, polyvinyl formal sponges, natural sponges, and the like, readily take up water and other liquids and function as liquid reservoirs. However, these sponges, particularly when wet, are inherently soft and non-abrasive, and do not exhibit the abrasiveness or wear-resistance of polyurethane sponges under scrubbing conditions. Attempts to form a composite structure comprised of preformed blocks or sheets of foam and sponge, bonded back-to-back through the agency of known adhesives, have failed principally for the reasons that the adhesive bond between the two preformed structures does not stand up well and there is insufficient permeability between the bonds, i.e., the bonding layer generally serves as a liquid barrier.

An object of this invention, therefore, is to provide a composite structure of polyurethane foam bonded to a dissimilar sponge, the composite structure having satisfactory strength and permeability over the area of the bond. Another object is to provide a simple, economical process for producing a polyurethane foam and hydrophilic sponge structure. Still another object is to provide a permeable, composite, cellular structure having one surface composed of polyurethane foam and an opposed surface composed of regenerated cellulose sponge. A further object is to provide a permeable composite cellular structure comprising a preformed sheet or block of regenerated cellulose sponge having one surface covered with polyurethane foam directly and strongly bonded to said surface. The foregoing and additional objects will more clearly appear hereinafter.

These objects are realized by the present invention which, briefly stated, comprises forming in situ on a surface of a preformed hydrophilic sponge structure, e.g., a block or sheet of regenerated cellulose sponge, a polyurethane foam by depositing on the treated sponge surface a fluid foam-forming mixture of water and a polyurethane product containing free isocyanate groups, said product resulting from the reaction of (1) an organic compound containing, as the sole reacting groups, a plurality of isocyanate groups, and (2) at least one polymeric organic substance containing active hydrogen. The foam sets up permanently, either sponstaneously or by the immediate application of heat, and cures to a final state upon standing at room temperature. The resulting foam is strongly adhered through a permeable bond which penetrates into the surface pores of the preformed spong structure.

The preparation of cellular plastic products (herein termed "polyurethane foams") from free isocyanate radical-containing polyurethane products resulting from the reaction between (1) an alkyd or other active hydrogen-containing organic polymeric material and (2) organic compounds containing, as the sole reacting groups, a plurality of isocyanate groups is described in "German Plastics Practice" by De Bell et al., 1946, pp. 316 and 463–465. Other disclosures of reactants and methods which may be employed to produce polyurethane foams applicable to this invention are United States Patents 2,282,827 (Rothrock), 2,284,637 (Catlin), 2,248,896 (Hanford et al.), 2,292,443 (Hanford), 2,333,639 (Christ et al.), 2,358,475 (Pratt et al.), and 2,374,163 (Rothrock); and United States patent applications Serial Nos. 340,168 (Detrick et al.), filed March 3, 1953, now U.S. Patent 2,787,601; 369,240 (Barthel), filed July 20, 1953, now U.S. Patent 2,788,335; 381,745 (Mitchell), filed September 22, 1953, now U.S. Patent 2,850,464; 383,370 (Barthel), filed September 30, 1953, now U.S. Patent 2,833,730; 395,843 (Roussel), filed December 2, 1953, now U.S. Patent 2,842,506; and 405,036 (Mitchell), filed January 19, 1954, now U.S. Patent 2,814,600.

As an organic compound containing, as the sole reacting groups, a plurality of isocyanate groups there may be used, in the preparation of the polyurethane product, any of the poly-NCX compounds, X being oxygen or sulfur, i.e., any polyisocyanate, any polyisothiocyanate, or any isocyanate-isothiocyanate. The polyisocyanates, because of their greater reactivity are preferred to the polyisothiocyanates. The preferred compounds are those having two groups of the formula —NCX and, of these, the aryl diisocyanates and the aryl diisothiocyanates in general are more useful in the practice of the present invention and form a preferred class because of their ease of preparation, low cost, reactivity, etc. Examples of this class are: 2,4-toluene diisocyanate, 2,6-toluene diisocyanate, m-phenylene diisocyanate, 4-chloro-1,3-phenylene diisocyanate, 1-chloro-phenylene 2,4-toluene diisocyanate, naphthalene 1,5-diisocyanate.

Active hydrogen-containing polymeric organic substances suitable for use in the preparation of polyurethane products may be selected from a wide variety of polyfunctional compounds, including polyamines, polyalcohols, aminoalcohols, polyhydroxy esters, polyamides, polythiols, polysulfonamides, and various mixtures of these types. Other long-chain polyhydroxy and polycarboxy compounds useful in this invention are alkyd resins containing terminal hydroxyl and carboxy groups, said resins being formed by the reaction between a polyhydroxy or polycarboxy compound with a dibasic acid. Examples of the alkyd resin reactants are: glycols, glycerine, trimethylol propane, reacted with dibasic acids, such as adipic, phthalic, succinic, maleic, and carbonic.

Formation of polyurethane foam can be varied within wide limits by a suitable selection of the reactive components, so as to vary the degree of hardness or elasticity. Catalysts and emulsifiers may be added to control the rate of foaming and the cell structure of the foam.

Although the combination of synthetic cellulose sponge and polyurethane foam constitutes the preferred combination of this invention, other sponges, such as polyvinyl formal sponge, natural sponge, sponge sheeting, etc., can be improved in utility in like manner by bonding on one or more surfaces thereof any polyurethane foam by the method indicated above. Cellulose sponge as employed in this invention may be manufactured by methods such as indicated in Banigan and Snyder, U.S. Patents 2,280,022 and 2,295,823.

A typical composite structure is illustrated in the accompanying drawing wherein the single figure is a side elevation of a composite structure made up of a layer or block or regenerated cellulose sponge and a superimposed layer or block of polyurethane foam formed in situ. By means of the seepage of the foam-forming fluid mixture into the surface pores of the sponge structure immediately as it is deposited on the sponge, polyurethane foam, as shown in the drawing, sets up in the surface pores as well thus adding to the area and strength of the bond. It is also believed that a chemical bond is created between the cellulose of the sponge and the polyurethane product.

The following example of a preferred embodiment further illustrates the principles and practice of this invention.

Example I

A polyurethane mixture was made as follows:

| | | |
|---|---|---|
| Polyester resin [1] | grams | 450 |
| Water | ccs | 14.1 |
| N-methyl morpholine | ccs | 6.4 |
| Polyoxyethylene vegetable oil (emulsifier) | grams | 13.0 |

[1] Polyester resin—Reaction product of diethylene glycol, adipic acid and trimethylol propane in a 13/13/1 molar ratio having the following properties:

| | | |
|---|---|---|
| Viscosity | centipoises | 16,000 |
| Acid No | | 2.02 |
| Specific gravity | | 1.194 |
| Percent water | | 0.17 |
| Solids | percent | 100 |
| Hydroxyl No | | 66.8 |

The above ingredients were mixed together until the mass appeared homogeneous. To this mixture 193 grams of 80% 2,4–20% 2,6 isomer of toluene diisocyanate were added and stirred in at slow speed for 12 seconds. As soon thereafter as possible, the mixture was poured evenly on a 30″ x 5″ x 2½″ thick slab of coarse pore cellulose sponge contained in a mold 30″ x 5″ x 2½″ high.

The polyurethane mixture was previously observed to start foaming after about 30 seconds and completed foaming after about 2 minutes. After approximately 1 hour the mass was removed from the mold and cured by standing at room temperature for 1 day.

For testing the strength of the bond relative to the strength of the cellulose sponge and polyurethane foam components, a similar experiment was run with the cellulose sponge and polyurethane foam each being 2½″ in height. Samples were cut 5″ x 5″ x 10″, from the block and aged 3 days at room conditions, and tested on a Scott tensile tester, pulling perpendicular to the bond in the 10″ direction. In every sample tested, the bond held firmly and the cellulose sponge or polyurethane foam tore apart.

Specific improved products, though not limited to these, which can be made by application of the above invention, in addition to an all-purpose household and industrial scrubbing and wiping sponge as mentioned before, include an all-purpose household and industrial scrubbing and wiping mop, and a quick-drying sponge mop which is less susceptible to bacterial degradation.

Other sponge uses, as disclosed in Banigan et al., U.S. Patents 2,280,022 and 2,295,823, and Saffert, U.S. Patent 2,138,712, may apply to the improved product and provide functional usage in wider utility than either sponge alone.

Household and industrial sponge mops, commonly made from cellulose sponge, can be improved in utility and wearability by bonding an abrasive foam onto part of the working surface of the sponge mop. The abrasive foam section of the mop can function to abrade in cleaning dirt and adhering material from the floor while the cellulose sponge section continues to function as in present cellulose sponge mops. For example, a mop can be made in which the abrasive foam fills and bonds into a groove or grooves cut into the working face of the cellulose sponge mop. Alternately, a mop can be made in which the abrasive foam fills an entire vertical section, for instance, the center vertical section, of the mop and the working face to the mop backing, and is bonded on either or on one vertical side to a cellulose sponge.

One drawback of cellulose sponge mops is the tendency to bacterial degradation next to the impermeable mop backing, perhaps because this is the last part of the mop to dry out after use. To eliminate this drawback, a mop can be made using the present invention in which a layer of foam with quick drying properties and with good air permeability, such as we are able to produce, is inserted between the major portion of the cellulose mop and the impermeable mop backing. A mop made in this manner will dry quickly and will be less susceptible to bacterial degradation.

I claim:
1. A process for producing a composite cellular structure which comprises depositing on a surface of a preformed hydrophilic regenerated cellulose sponge structure a fluid foam-forming mixture of water and a polyurethane product containing a plurality of free isocyanate groups whereby to form in situ on said surface a permanent polyurethane foam, and thereafter curing said foam.

2. The process of claim 1 wherein the polyurethane product is the reaction product of toluene diisocyanate and a polyester resin of diethylene glycol, adipic acid and trimethylol propane.

3. As a new article of manufacture a composite comprising a hydrophilic regenerated cellulose sponge structure having directly bonded to a surface thereof a layer of polyurethane foam.

4. As a new article of manufacture a parallelepiped of hydrophilic regenerated cellulose sponge material having directly bonded to a face thereof a layer of polyurethane sponge.

5. As a new article of manufacture a composite comprising a hydrophilic regenerated cellulose sponge structure a surface of which is covered with polyurethane foam formed in situ thereon.

References Cited in the file of this patent

UNITED STATES PATENTS

| | | |
|---|---|---|
| 2,356,079 | Nelles et al. | Aug. 15, 1944 |
| 2,468,716 | Nyquist et al. | Apr. 26, 1949 |
| 2,820,314 | Scott | Jan. 21, 1958 |
| 2,848,840 | O'Brien et al. | Aug. 26, 1958 |
| 2,880,443 | Le Febvre | Apr. 7, 1959 |
| 2,906,642 | Dennis | Sept. 29, 1959 |
| 2,906,643 | Dennis | Sept. 29, 1959 |

FOREIGN PATENTS

| | | |
|---|---|---|
| 578,404 | Great Britain | June 27, 1946 |
| 1,103,628 | France | May 25, 1955 |
| 748,990 | Great Britain | May 16, 1956 |